US010309603B2

(12) United States Patent
Meyrenaud et al.

(10) Patent No.: US 10,309,603 B2
(45) Date of Patent: Jun. 4, 2019

(54) DUAL-FUNCTION LOW-HIGH BEAM LIGHTING MODULE FOR A MOTOR VEHICLE (71) Applicant: Valeo Vision, Bobigny (FR)

(72) Inventors: Jean-Luc Meyrenaud, Livry Gargan (FR); Paul Racine, Paris (FR); Ziyed Thabet, Paris (FR)

(73) Assignee: Valeo Vision, Bobigny (FR)

( * ) Notice: Subject to any disclaimer, the term of this patent is extended or adjusted under 35 U.S.C. 154(b) by 470 days.

(21) Appl. No.: 15/149,365

(22) Filed: May 9, 2016

(65) Prior Publication Data
US 2016/0334072 A1 Nov. 17, 2016

(30) Foreign Application Priority Data

May 13, 2015 (FR) ..................................... 15 54308

(51) Int. Cl.
B60Q 1/14 (2006.01)
B60Q 1/16 (2006.01)
F21S 41/24 (2018.01)
F21S 41/26 (2018.01)
F21S 41/143 (2018.01)
F21S 41/663 (2018.01)

(52) U.S. Cl.
CPC ............ *F21S 41/26* (2018.01); *B60Q 1/1407* (2013.01); *B60Q 1/16* (2013.01); *F21S 41/143* (2018.01); *F21S 41/24* (2018.01); *F21S 41/663* (2018.01)

(58) Field of Classification Search
CPC ...... F21S 41/26; F21S 41/663; B60Q 2400/30
See application file for complete search history.

(56) References Cited

U.S. PATENT DOCUMENTS

| 7,168,837 | B2 | 1/2007 | Ishida et al. |
| 7,384,176 | B2 | 6/2008 | Ishida |
| 8,646,956 | B2 | 2/2014 | Hering et al. |
| 2004/0136197 | A1 | 7/2004 | Ishida |
| 2004/0196663 | A1 | 10/2004 | Ishida et al. |
| 2011/0080753 | A1 | 4/2011 | Hering et al. |
| 2014/0029289 | A1* | 1/2014 | Mochizuki ............... B60Q 1/06 362/525 |
| 2014/0104864 | A1 | 4/2014 | Brendle |
| 2014/0175978 | A1 | 6/2014 | Kobayashi |
| 2014/0362600 | A1* | 12/2014 | Suckling ............. F21S 48/1225 362/583 |

(Continued)

FOREIGN PATENT DOCUMENTS

| EP | 1213178 A2 | 6/2002 |
| EP | 1418621 A2 | 5/2004 |
| EP | 2719940 A2 | 4/2014 |

(Continued)

Primary Examiner — William N Harris
(74) Attorney, Agent, or Firm — Oblon, McClelland, Maier & Neustadt, L.L.P.

(57) ABSTRACT

A lighting module for a motor vehicle headlight intended to produce a low beam having an at least partly oblique cut-off. This same module further comprises an additional lighting function making it possible to generate a high type beam, the dimensions of the lighting module remaining identical. The light sources of the two respective low and high beam functions are arranged in a vicinity of the focus of an optical portion of the module such that the lighting module remains compact.

20 Claims, 6 Drawing Sheets (56) References Cited

U.S. PATENT DOCUMENTS

2016/0146418 A1\* 5/2016 Iwasaki ................ F21S 41/141
                                                          362/520
2017/0030544 A1\* 2/2017 Tsuda ..................... G02B 26/10

FOREIGN PATENT DOCUMENTS

EP      2752615 A1   7/2014
FR      2853395 A1   10/2004

\* cited by examiner

Fig. 13

DUAL-FUNCTION LOW-HIGH BEAM LIGHTING MODULE FOR A MOTOR VEHICLE

CROSS-REFERENCE TO RELATED APPLICATIONS

This application claims priority to the French application 1554308 filed May 13, 2015, which applications are incorporated herein by reference and made a part hereof.

BACKGROUND OF THE INVENTION

1. Field of the Invention

The present invention relates to a lighting module, notably for a motor vehicle. The lighting module is dual function, that is to say that it comprises a first lighting function of low beam type and, furthermore, a second lighting function of high beam type, complementing the low beam function.

2. Description of the Related Art

Car headlights are often provided with different modules, each module being dedicated to generating different types of lighting: high beams, dipped beams (also called low beam), fog lights, etc. In order to limit the bulk resulting from the arrangement of different modules within a same headlight, and at the same time in order to reduce the associated costs, it is desirable to combine different modules and/or to reduce the size of the modules within a same headlight.

In particular, the document U.S. 2011/0008753 A1 describes a device that makes it possible to combine the functionalities relating to the fog lights and to the dipped beam lights. For this, the document proposes the use of two semiconductor elements emitting light, each element being able to be selectively controlled in order to generate the type of light required by the driver. This type of module allows compatibility between the fog lights and the dipped beam lights within a single module. However, it does not make it possible to provide both low beam and high beam light functions.

SUMMARY OF THE INVENTION

One object of the present invention is to incorporate an additional lighting function in a module intended to generate a low beam. Preferentially, the object of the present invention is to add the lighting function forming the high beam to the low beam module without having to increase its dimensions or add other mechanical elements.

The invention proposes a lighting module, notably for a motor vehicle, comprising an optical element intended to produce at least one first beam exhibiting an at least partly oblique cut-off, and at least one first light source, wherein the module comprises the optical element comprising at least one optical portion having an optical axis and a focus, the first light source being arranged at the focus and suitable for emitting first light rays toward the optical element to produce the first beam, the module further comprises a second light source, the second light source being arranged at a distance from the focus and offset downward relative to the first light source on a vertical axis, the second light source being suitable for emitting second light rays toward the optical element to produce a second beam at least partially lighting above the cut-off.

Oblique cut-off part should be understood to mean a cut-off part that is oblique with respect to the rest of the cut-off.

Advantageously, the first beam exhibits a cut-off of low beam lighting cut-off type. In this case, the first beam is intended to form part of a low type beam.

Advantageously, the optical element is arranged to project, from the first light rays, a plurality of images of the first source such that the top edges of these images are aligned and/or superposed to form the oblique part of the cut-off of the first beam.

According to a feature of the invention, the second light source is offset vertically relative to the focus by a distance such that a plurality of images of the second source, formed by the projection of the second light rays by the optical element, are arranged at least partially above the cut-off of the first beam. If necessary, the second beam can have a light distribution of complementary high beam type.

Preferentially, the second light source is offset relative to the first light source on a transverse axis such that the light beams are concentrated on the optical axis to form thereon a light spot whose characteristics are those of a high beam. For example, the second light source is offset transversely relative to the focus by a distance such that a plurality of images of the second source, formed by the projection of the second light rays by the optical element, are concentrated on the optical axis.

Advantageously, the first light source exhibits a light emission zone comprising an edge, this edge being arranged at the focus of the optical portion of the optical element.

If necessary, the first light source can be oriented facing the optical element such that the edge is an oblique edge. For example, the oblique edge extends facing a transverse axis of the optical element.

Advantageously, the second light source is oriented facing the optical element identically to the orientation of the first light source facing the optical element.

Preferentially, a low-type beam, comprising the first beam, is generated when the first light source is switched on, the second light source being switched off.

Advantageously, a high-type beam, comprising a superpositioning and/or a juxtapositioning of the first and second beams, is generated when the first and second light sources are switched on.

Optionally, a beam of daytime running light type is generated when the second light source is switched on while being powered using an electrical power lower than that needed to generate the second beam, the first light source being switched off.

Preferentially, the distance between the two light sources is less than or equal to a fraction of the focal distance of the optical portion. For example, if f denotes the focal distance, the distance between the two light sources can be less than or equal to f*tan(0.57°), i.e. approximately f/100.

Advantageously, the first and second light sources each consist of a semiconductive light-emitting chip that can be selectively activated. For example, the first and second sources are formed by a same light-emitting diode of dual-chip type.

As a variant, the first and second light sources are formed by a matrix of diodes comprising at least two diodes each forming one of the light sources.

Preferentially, the optical portion is a lens.

Advantageously, the material of the optical portion comprises silicone, glass, polycarbonate or PMMA.

Preferentially, the first beam is intended to form part of a low-type beam. If necessary, the optical element can comprise at least one second optical portion having an optical axis, a focus and a third light source arranged in the vicinity of the focus of the second optical portion to produce at least one second beam forming part of the low-type beam.

These and other objects and advantages of the invention will be apparent from the following description, the accompanying drawings and the appended claims.

BRIEF DESCRIPTION OF THE ACCOMPANYING DRAWINGS

The invention will be better understood in light of the following description which is given purely in an indicative and nonlimiting manner, accompanied by the attached drawings in which.

DETAILED DESCRIPTION OF THE PREFERRED EMBODIMENTS

Figure 1:
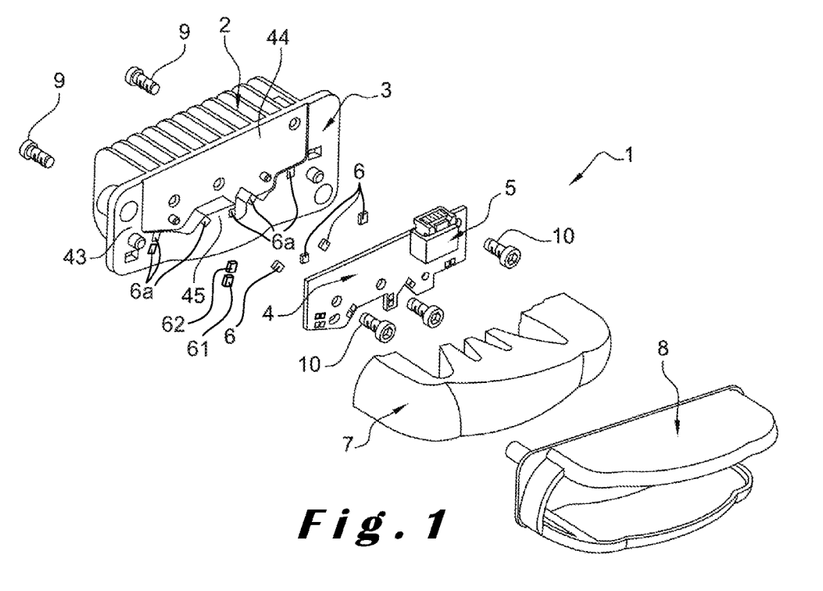
FIG. 1 is an exploded view of a light module according to the invention.

Referring to FIG. 1, a light module 1 according to the invention comprises a heat sink 2 linked to a substrate 3, an electronic board 4, of the printed circuit board type, provided with an electrical connector 5, six light-emitting diodes 6, 61, 62 (four of them bearing the same reference 6) which will be called LED (Light Emitting Diode) hereinafter in the description, an optical element 7 of transparent material according to the invention and a protective and secure casing 8, suitable for fitting tightly around the optical element 7. The casing 8 is for example fixed to the substrate 3 by means of a first series of screws 9. The electronic board 4 is for example anchored in the substrate 3 by means of a second series of screws 10. The substrate 3 further comprises six locations 6a intended for positioning the light-emitting diodes 6. Such a light module 1 is intended to be fixed, for example, inside a vehicle headlight.

Figure 2:
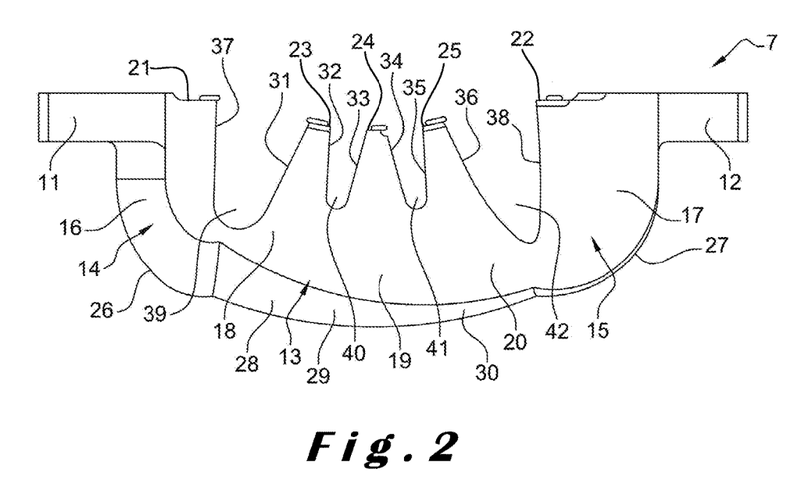
FIG. 2 is a plan view of an optical element according to the invention.

Referring to FIG. 2, the optical element 7 of transparent material according to the invention is solid and is produced for example in PC (polycarbonate), and acts as an optical lens.

This optical element 7 schematically comprises two lateral tabs 11, 12 and a central body 13 situated between the tabs 11, 12. The body 13 is edged by two end arms 14, 15, each linked to a tab 11, 12, each of the end arms 14, 15 extending in a direction which is at right angles to that of the tabs 11, 12 to which it is connected. The two tabs 11, 12 are strictly aligned, so that the optical element 7 can come to bear against a planar surface, via its tabs 11, 12.

Advantageously, the body 13 of this optical element 7 is divided into five solid basic portions 16, 17, 18, 19, 20, each and respectively characterized by an input surface 21, 22, 23, 24, 25 and an output surface 26, 27, 28, 29, 30. This optical element 7 thus has two basic end portions 16, 17, forming the two end arms 14, 15, and three basic intermediate portions 18, 19, 20 positioned between the end portions 16, 17. The five output surfaces 26, 27, 28, 29, 30 are contiguous, to form an overall output surface of the optical element 7 which is continuous. The five input surfaces 21, 22, 23, 24, 25 are separated from one another, and are substantially aligned with the two tabs 11, 12. Each portion 16, 17, 18, 19, 20 is elongate, the input surface 21, 22, 23, 24, 25 and the output surface 26, 27, 28, 29, 30 forming the two ends of each of the portions 16, 17, 18, 19, 20 along their longitudinal axis. The three basic intermediate portions 18, 19, 20 each have two walls 31, 32, 33, 34, 35, 36 starting from the input surface 23, 24, 25 and extending toward two edges delimiting the output surface 28, 29, 30 of the same portion 18, 19, 20. These walls 31, 32, 33, 34, 35, 36, which can for example be aluminized, are intended to prevent the beams produced by a light source placed at the input surface 23, 24, 25 of the portion 18, 19, 20 from passing through the output surface of an adjacent portion. The two basic end portions 16, 17 have only a single wall 37, 38 intended to prevent a light source placed at the input surface 21, 22 of one of them from irradiating an output surface of an adjacent basic portion, since each of the end portions 16, 17 has only a single adjacent basic portion. The walls 31, 32, 33, 34, 35, 36, 37, 38 of two adjacent basic portions 16, 17, 18, 19, 20 meet by means of a curved wall segment. The optical element 7 thus exhibits a series of four hollows 39, 40, 41, 42 aligned alternately with the five basic portions 16, 17, 18, 19, 20, each hollow 39, 40, 41, 42 being thus delimited by a wall of a basic portion and by a wall of an adjacent basic portion. The two input surfaces 21, 22 of the two end basic portions 16, 17 are situated set back from the input surfaces 23, 24, 25 of the three basic intermediate portions 18, 19, 20. For each of the five basic portions 16, 17, 18, 19, 20, the average distance separating the input surface 21, 22, 23, 24, 25 and the output surface 26, 27, 28, 29, 30 is substantially constant. The input surfaces 21, 22, 23, 24, 25 are planar and the output surfaces 26, 27, 28, 29, 30 are of rounded form.

Preferably, each output surface (26, 27, 28, 29, 30) of a portion (16, 17, 18, 19, 20) assumes a focus which is situated substantially at the level of the corresponding input surface (21, 22, 23, 24, 25). The form of each output surface 26, 27, 28, 29, 30 is substantially that of an ellipsoidal portion.

The fact that the focus of each output surface 26, 27, 28, 29, 30 is located at the level of the input surface 21, 22, 23, 24, 25 of the same portion 16, 17, 18, 19, 20, means that there is a point or a horizontal segment in the vicinity of the input surface 21, 22, 23, 24, 25 such that a majority of the rays from this point or points of the line emerge from the output surface 26, 27, 28, 29, 30 parallel to a same plane.

Referring to FIG. 1, the heat sink 2 and the substrate 3 constitute a single-piece element, preferably of metal. The substrate 3 can be likened to a plate of small thickness having an installation face 43 provided with a cutaway 44 whose outline is similar to that of the electronic board 4, the cutaway 44 being intended to receive the electronic board 4. This installation face 43 has a central protuberance 45 partially edging the cutaway 44 and contributing to partially enlarging the edge surrounding the cutaway 44.

Referring to FIG. 1, the six LEDs 6, 61, 62 are secured to the installation face 43 of the substrate 3, which is provided with the cutaway 44, in a zone outside the cutaway 44.

More specifically, referring to FIG. 1, the six LEDs 6, 61, 62 are arranged along the edge delimiting the cutaway 44, three LEDs 6 being placed on the central protuberance 45 and the other three LEDs 6, 61, 62 being placed on the installation face 43 of the substrate 3 situated at an altitude that is lower than that of the central protuberance 45. In this way, three end LEDs 6, 61, 62 frame three raised intermediate LEDs 6. Each LED 6, 61, 62 has a photoemissive element of substantially square form and having a small thickness.

The six LEDs 6, 61, 62 are turned differently relative to the forward direction, i.e., the direction of emission of the light module 1. In other words, seen from the front, these LEDs 6, 61, 62 have different orientations. For example in projection on a plane of projection situated in front of the LEDs 6, 61, 62 and at right angles to the optical axis of emission of the light module 1, these LEDs 6, 61, 62 exhibit different orientations within the plane of projection. Thus, two LEDs 6, 61 or 62 can be arranged in such a way that the edges of their photoemissive elements exhibit, seen from the front, a different orientation. The oblique edges extend facing a transverse axis of the optical element 7. These edges can, seen from the front, form between them an angle of 45°. These six LEDs 6, 61, 62 are arranged to emit a light beam in the same direction.

As illustrated in FIG. 1, the optical element 7 according to the invention is fixed onto the substrate 3 so that each of the six LEDs 6, 61, 62, secured to the substrate 3, comes to be positioned respectively at the input surface 21, 22, 23, 24, 25 of the optical element 7, illustrated in FIG. 2, apart from the input surface 21 which is facing two LEDs 6, such that each LED 6 can send a light beam toward the input surface 21, 22, 23, 24, 25 with which it is associated, the beams passing through the input surface 21, 22, 23, 24, 25 to then pass through the output surface 26, 27, 28, 29, 30 of the same portion. Thus, the light beams from each input surface 21, 22, 23, 24, 25 can either directly arrive at the corresponding output surface 26, 27, 28, 29, 30, or be previously reflected on the walls 31, 32, 33, 34, 35, 36, 37, 38 before arriving on the output surface 26, 27, 28, 29, 30. The walls 31, 32, 33, 34, 35, 36, 37, 38 prevent the light beams emitted by the LED 6, 61, 62 placed level with a basic portion 16, 17, 18, 19, 20 from arriving at the output surface 26, 27, 28, 29, 30 of an adjacent basic portion 16, 17, 18, 19, 20. The basic portions 16, 17, 18, 19, 20 act separately and independently, in order to obtain a resultant light beam, without spurious interference.

Figure 11:
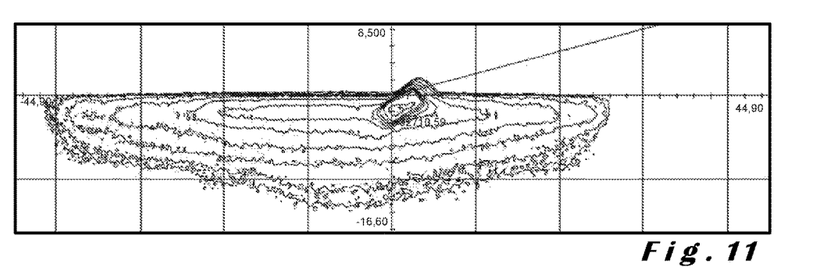
FIG. 11 is an isolux diagram generated by the LED of the optical element, in low beam mode.
Figure 12:
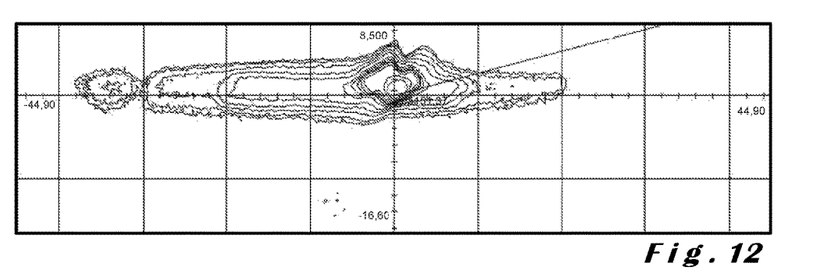
FIG. 12 is an isolux diagram generated by the LED of the optical element, in high beam mode.
Figure 13:
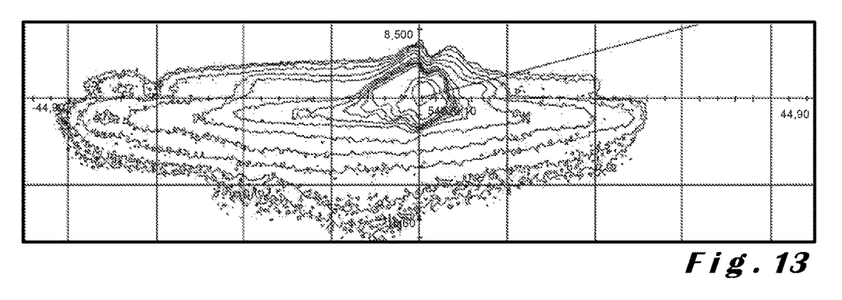
FIG. 13 is an isolux diagram generated by the LED of the optical element, combining the low and high beams.

FIGS. 3A to 7B illustrate an example of use of the light module 1 according to the invention, by breaking down the resultant light beam into a plurality of components each deriving from the basic portion 16, 17, 18, 19, 20 of the light module 1 associated with the corresponding LED 6, 61, 62. The basic portion 16 comprises two light sources 61, 62: a first LED 61 produces at least one first beam, this first beam being a component of a low beam, a second LED 62 produces at least one second beam, this second beam being a component of a high beam. The light beam originating from the second LED 62 of the basic portion 16 is illustrated in FIGS. 11 to 13.

A low beam generally comprises an oblique cut-off. Preferentially, the first beam generates at least a part of the oblique cut-off of the low beam, the part of the cut-off being defined by a part of the oblique cut-off of the low beam cut-off.

Figure 3A:
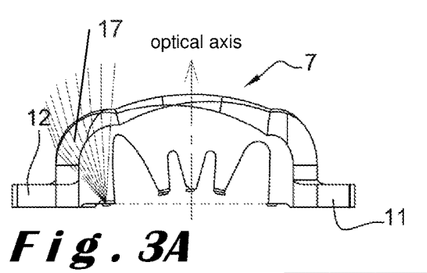
FIG. 3A is a view similar to FIG. 2, illustrating an exemplary trajectory of light beams from a first diode of a light module according to the invention.
Figure 3B:
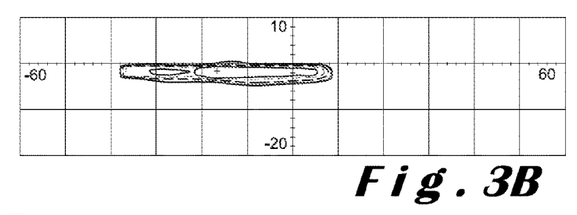
FIG. 3B is an isolux diagram of the light beam produced by the first diode of FIG. 3A.

In this way, referring to FIGS. 3A and 3B, the end basic portion 17 situated to the left of the light module 1 and associated with the corresponding end LED 6, can serve to produce a lighting to the left that is focused over the range. This lighting is more concentrated and intense.

Figure 4A:
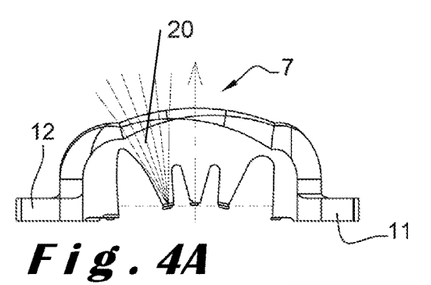
FIG. 4A is a view similar to FIG. 2, illustrating an exemplary trajectory of light beams from a second diode of a light module according to the invention.
Figure 4B:
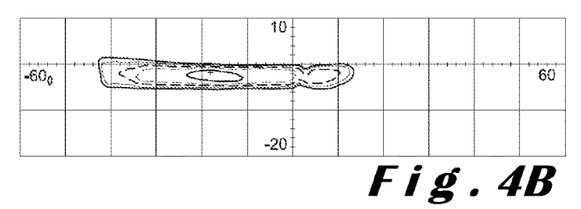
FIG. 4B is an isolux diagram of the light beam produced by the second diode of FIG. 4A.

Referring to FIGS. 4A and 4B, the left intermediate basic portion 20, associated with the corresponding LED 6, can serve to produce a lighting that is extended horizontally to the left. This lighting is not so intense and spread transversely relative to the vehicle.

Figure 5A:
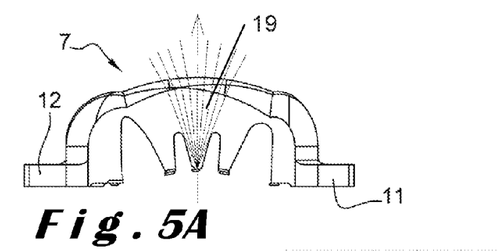
FIG. 5A is a view similar to FIG. 2, illustrating an exemplary trajectory of light beams from a third diode of a light module according to the invention.
Figure 5B:
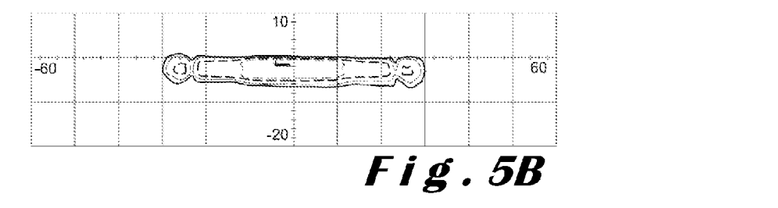
FIG. 5B is an isolux diagram of the light beam produced by the third diode of FIG. 5A.

Referring to FIGS. 5A and 5B, the central intermediate basic portion 19, associated with the corresponding LED 6, can serve to produce a lighting that is extended horizontally equally to the right and to the left. This lighting is not so intense and spread transversely relative to the vehicle.

Figure 6A:
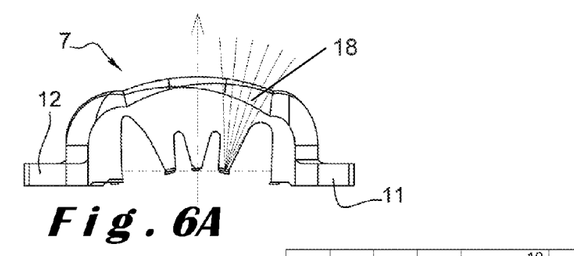
FIG. 6A is a view similar to FIG. 2, illustrating an exemplary trajectory of light beams from a fourth diode of a light module according to the invention.
Figures 6B, 7A, 7B:
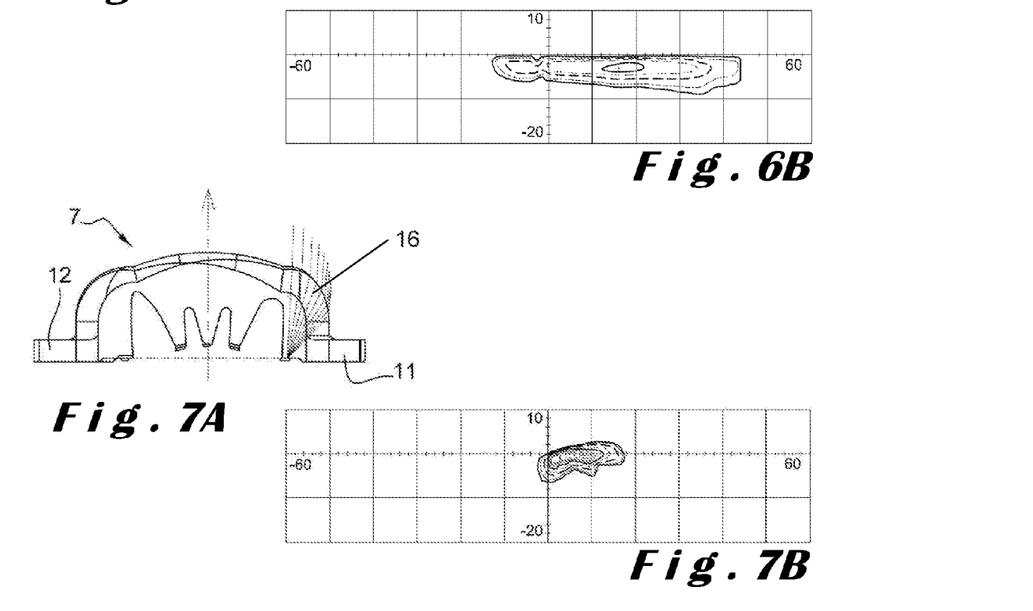
FIG. 6B is an isolux diagram of the light beam produced by the fourth diode of FIG. 6A.
FIG. 7A is a view similar to FIG. 2 illustrating an exemplary trajectory of light beams from a fifth diode of a light module according to the invention.
FIG. 7B is an isolux diagram of the light beam produced by the fifth diode of FIG. 7A.

Referring to FIGS. 6A and 6B, the right intermediate basic portion 18, associated with the corresponding LED 6, can serve to produce a lighting that is extended horizontally to the right. This lighting is not so intense and spread transversely relative to the vehicle.

Referring to FIGS. 7A and 7B, the end basic portion 16 situated to the right of the light module 1 is associated with two corresponding end LEDs 61 and 62 (illustrated in FIG. 1). Preferably, the first LED 61 produces a left lighting of range, inclined by an angle of 45° relative to a horizontal axis. This lighting is more concentrated and intense and is illustrated in the isolux diagram of FIG. 7B. The lighting produced by the second LED 62 is illustrated in FIGS. 11 to 13. The lightings produced by the portions 16, 17, 18, 19 and 20 are extended horizontally. They are dedicated to illuminating the road in front of the driver. The latter can notably be used to generate a part of the lighting required by low beam lights of a vehicle. The different lighting distributions illustrated in FIGS. 3B to 7B show that these components comprise a horizontal cut-off, that is to say that there is no lighting beyond the line indicating the horizontal in the isolux diagrams of the light beam.

The second light source 62 of the portion 16 is suitable for generating a high beam light. The position of the second light source 62 is determined in such a way that when the second light source 62 is located in this position, it generates a lighting corresponding to a high beam light.

The high beam lights do not have any cut-off. The intensity of the high beam lights is concentrated and intense along the optical axis. They light at least partially beyond the horizontal cut-off of the low beam lights. The intensity required by the regulation can be of the order of 40500 candela. The lighting produced by the low beam lights offers good visibility without dazzling the other users of the road and generally comprise a horizontal cut-off and an oblique cut-off in order to illuminate the signs located at the side of the road, and the sidewalks or the verges. The intensity of the low beam lights is of the order of 36000 candela.

Figure 8:
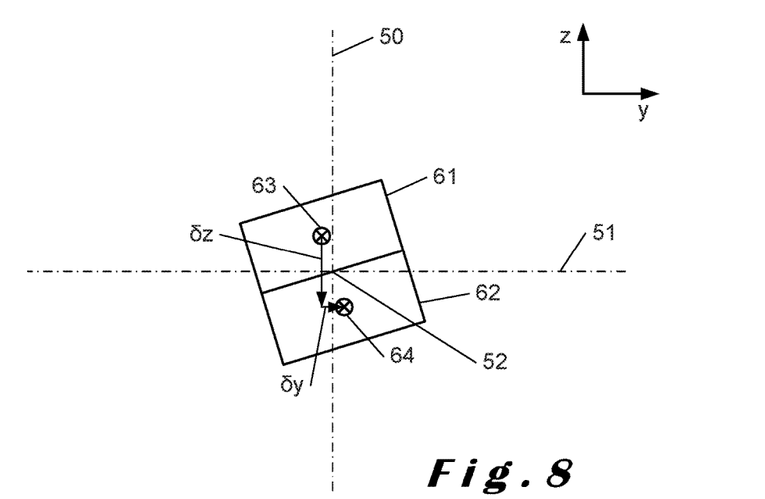
FIG. 8 is a diagram illustrating the displacement between the two light sources.

FIG. 8 illustrates the displacement vector between the positions of the two light sources. The two light sources are indicated by the references 61 and 62. The displacement vector comprises a vertical component along the axis z (−δz) and a lateral component along the axis y (δy), the axes y and z being illustrated in FIG. 8. The intersection 52 between the vertical axis 50 and the horizontal axis 51 is the plot of the optical axis of the portion 16. The term vertical is understood when the light module 1 is arranged in normal conditions of use.

Figure 9:
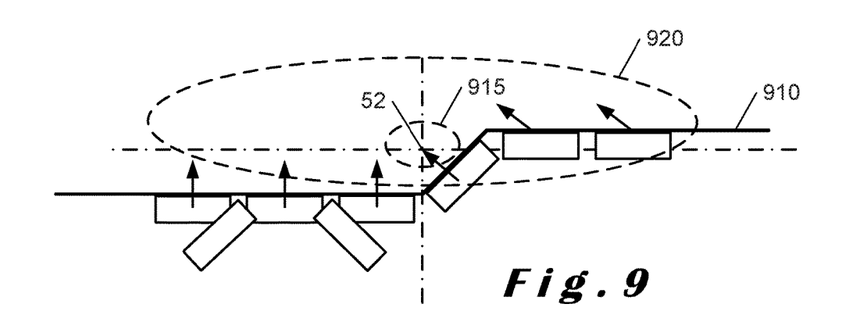
FIG. 9 is a diagram illustrating the displacement of the images from the first position to the second position.

FIG. 9 schematically illustrates the difference in the arrangement of the images between those produced by the first light source 61 and those produced by the second light source 62 respectively.

Preferentially, the center 63 of the first LED 61 is located slightly above the optical axis. The edge of the first LED 61 is inclined at 45° and intersects the optical axis. In fact, it is the edge of the first LED 61 which produces the cut-off. The images produced by the first light source 61 are illustrated in FIG. 9. The images are all situated below the cut-off 910. Preferentially, the images are aligned and/or superposed to form the oblique part of the cut-off of the first beam. The legislation requires the high beams to emit forward over a minimum distance of 100 meters. The lighting produced by high beams must therefore be concentrated and intense along the optical axis.

To raise the images produced by the first LED 61, the displacement vector must include a vertical component oriented downward, −δz, such that the second position is situated under the optical axis, as illustrated in FIG. 8. The second light source 62 is offset vertically relative to the focus by a distance such that a plurality of images of the second light source 62, formed by the projection of the second light rays by the optical element 7, are arranged at least partially above the cut-off of the first beam. The second beam exhibits a light distribution of complementary high beam type. FIG. 9 illustrates the displacement of the images. The images which were under the cut-off of the low beam for the first light source 61 are displaced above the cut-off and contribute to the volume 920 (width and thickness) of the high beam.

Also, the second LED 62 is also offset laterally relative to the first position such that the oblique images forming the cut-off at 15 degrees for the first LED 61 are superposed on the horizontal and vertical images originating from the offset −δz along the vertical axis z. This offset δy is illustrated in FIG. 8. The second LED 62 is offset transversely relative to the focus by a distance such that a plurality of images of the second LED 62, formed by the projection of the second light rays by the optical element 7, are concentrated on the optical axis. The overlapping of the images contributes to the concentration of the high beam along the optical axis of the portion 16. This concentration of the beam is illustrated by the central ellipse 915 of FIG. 9. These two positions of the LEDs 61 and 62 in FIG. 8 are situated in the vicinity of the focus of the outer surface 26, which is situated on the optical axis. The center 63 of the first light source (61) is substantially offset upward and to the left of the focus and the center 64 of the second light source (62) is substantially offset downward and to the right of the focus. The fact that the two light sources 61, 62 are close to one another ensures that the light module 1 is compact and that there is a continuity in the lighting generated by the two beams. The left and right are defined relative to the optical axis, which is oriented in the direction of propagation of the light.

Different embodiments are described to couple the two types of lights in a single light module 1 or in a portion of light module 1.

In a preferential embodiment, the optical portion 16 of the optical element 7 assumes an optical source in each of the two positions. Consequently, in order to produce a low beam, the first light source 61 is switched on and the second light source 62 is switched off. In order to exclusively produce a high-type beam, the first light source 61 is switched off and the second light source 62 is switched on. It is also possible to combine the two types of beams by switching on both the light sources 61, 62 so as to produce a more intense high-type beam.

Advantageously, the distance between the two LEDs 61, 62 depends on the dimensions of the lens and its optical characteristics. However, the smaller the size of the lens, the more accurate the positions of the light sources 61, 62 have to be.

Preferentially, the dimensions of the optical element 7 are of the order of 20 mm in the heightwise direction and of the order of 110 mm in the widthwise direction. For an optical element 7 that has a size of this order of magnitude, the distance between the two light sources 61, 62 intended to generate the high- and low-type beams in an identical optical portion preferably lies between 2 and 5 mm, preferentially between 3 and 4 mm. This distance is advantageously less than a fraction of the focal distance of the optical portion. This fraction is preferentially of the order of f*tan(0.57°), i.e., f/100 if f is the focal length of the optical portion. This distance is more easily feasible by means of a matrix of addressable diodes comprising at least two photo-emitting surfaces. The diode matrices offer the advantage of having close photo-emitting surfaces that can be switched on separately. Also, the emissive surfaces are smaller than for independent LEDs 61, 62. There is also a benefit in that the photo-emitting surfaces are adjacent for the maximum intensity of the high beam not to be situated too high. The result thereof is that, when the two light sources 61, 62 are adjacent, the lighting generated by the two light sources 61, 62 is uniformly distributed.

Figure 10:
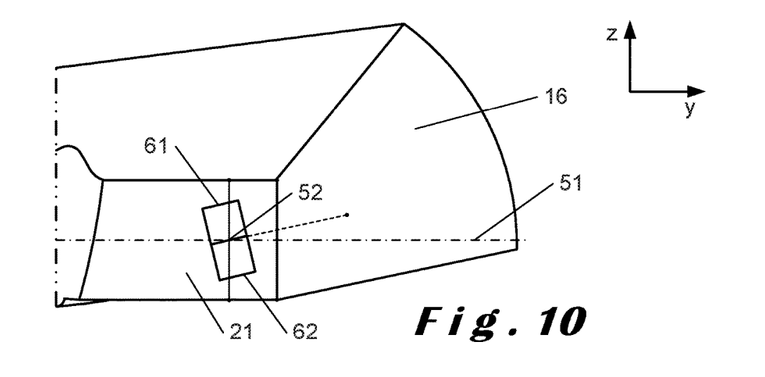
FIG. 10 is a view from behind of the optical portion illustrating the two light sources.

FIG. 10 illustrates the input surface 21 of the basic portion 16. It comprises the two LEDs 61, 62 intended to generate a lighting comprising the oblique cut-off of a low beam light and a high beam light respectively. Only the emissive surfaces of the LEDs 61, 62 have been represented, and not their connection surfaces. Each of the positions of these LEDs 61, 62 is defined above and below the optical axis of the basic portion 16. It is the position of the light sources 61, 62 relative to the optical axis which determines the direction of propagation of the rays. The first LED 61 produces a lighting whose intensity is located under a horizontal and oblique cut-off. The second LED 62 produces a high beam light whose beam is raised and more concentrated relative to the beam of the low beam light. In FIG. 10, the two photo-emitting surfaces are adjacent, as in a matrix of addressable diodes.

FIG. 11 is an isolux diagram of the portion 16 of the optical element 7. Only the LED 61 dedicated to the low beam light is switched on. The horizontal cut-off and the oblique cut-off at 15 degrees, which are low beam light characteristics, can be seen.

FIG. 12 illustrates an isolux diagram similar to that of FIG. 10, but only the LED 62 dedicated to the high beam light is switched on. As described in the context of the diagram of FIG. 9, the distribution of the lighting is displaced upward, and the light intensity is concentrated in a vicinity of the center of the diagram corresponding to the optical axis.

FIG. 13 illustrates a third isolux diagram relating to the optical element 7 in which the LEDs 61, 62 dedicated to the low beam light and to the high beam light are switched on. The result thereof is a distribution of the lighting above and below the horizontal cut-off with a concentration of the light intensity in the vicinity of the center of the diagram.

As FIGS. 3A, 4A, 5A, 6A, 7A clearly show, the light beams produced by each LED 6, 61, 62 of the light module 1, pass only through the basic portion 16, 17, 18, 19, 20 with which the LED or LEDs 6, 61, 62 are associated, without being able to be directed towards the output surface 26, 27, 28, 29, 30 of an adjacent basic portion 16, 17, 18, 19, 20. It evolves therefrom that the light module 1 according to the invention is suitable for producing a resultant light beam, which is clear and precise, because it is free of any stray light beams due to light interferences between the different basic portions 16, 17, 18, 19, 20 of the light module 1.

Although the LEDs 6, 61 and 62 are illustrated identically in the figures, they can naturally have different structural, geometric and light characteristics within a same light module 1, the LEDs 6, 61 and 62 being chosen according to the specific lighting requirements.

Preferentially, the light sources 6, 61, 62 are light-emitting diodes and the above description has been given in this context. Such a diode offers a good light beam quality, while still of small size. It is therefore perfectly suited to the light module 1 according to the invention, whose dimensions must be limited to be able, for example, to be incorporated in a motor vehicle.

The type of light source 6, 61, 62 used in the present invention is not however limited to that of a light-emitting diode. The light source 6, 61, 62 can also be an incandescent lamp, a gas discharge lamp, a laser source or any type of source that makes it possible to generate a beam having properties similar to the properties described above.

The headlight manufacturer now only has to design a single optical element 7, with single manufacturing toolages (molds for example), making it possible to manufacture a single light module 1 compatible with the different types of beam lights, preferentially, the low beam lights and high beam lights.

The light module 1 according to the invention has a compact geometry, and consequently has little bulk.

Preferentially, the rays emitted by the light module 1 at the output of the output surface 26, 27, 28, 29, 30 of the light module 1 form a portion or all of a road lighting beam, signaling, or vehicle interior lighting. In this way, there is no point in fitting another optical deflection element or a cover. In other words, the light module 1 can be free of lens, reflector or cover after the output surface 26, 27, 28, 29, 30.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting module for a motor vehicle, comprising:
   an optical element to produce at least one first beam exhibiting an at least partly oblique cut-off, the optical element comprising at least one first optical portion having an optical axis and a focus,
   at least one first light source, the at least one first light source being arranged at the focus for emitting first light rays toward the optical element to produce the at least one first beam, and
   a second light source, the second light source being arranged at a distance from the focus, and not overlapping the focus, and offset downward relative to the at least one first light source on a vertical axis, the second light source emitting second light rays toward the optical element to produce a second beam at least partially lighting above the at least partly oblique cut-off, an optical beam formed by overlapping of the first beam with the second beam exhibiting no cut-off.

2. The lighting module according to claim 1, wherein the second light source is offset relative to the at least one first light source on a transverse axis.

3. The lighting module according to claim 1, wherein the at least one first light source exhibits a light emission zone comprising an edge, the edge being arranged at the focus of the at least one first optical portion of the optical element.

4. The lighting module according to claim 3, wherein the at least one first light source is oriented facing the optical element such that the edge is an oblique edge.

5. The lighting module according to claim 4, wherein the second light source is oriented facing the optical element identically to the at least one orientation of the first light source facing the optical element.

6. The lighting module according to claim 1, wherein a low-type beam, comprising the at least one first beam, is generated when the at least one first light source is switched on, the second light source being switched off.

7. The lighting module according to claim 1, wherein a high-type beam, comprising a superpositioning or a juxtapositioning of the at least one first beam and the second beam, is generated when the at least one first light source and the second light source are switched on.

8. The lighting module according to claim 1, wherein a beam of daytime running light type is generated when the second light source is switched on while being powered using an electrical power lower than that needed to generate the second beam, the at least one first light source being switched off.

9. The lighting module according to claim 1, wherein a distance between the at least one first light source and the second light source is less than or equal to a fraction of the focal distance of the at least one first optical portion.

10. The lighting module according to claim 1, wherein the at least one first light source and the second light source each comprise a semiconductive light-emitting chip that can be selectively activated.

11. The lighting module according to claim 10, wherein the at least one first light source and the second light source are formed by a same light-emitting diode of dual-chip type.

12. The lighting module according to claim 1, wherein the at least one first light source and the second light source are formed by a matrix of diodes comprising at least two diodes each forming one of the at least one first light source and the second light source.

13. The lighting module according to claim 1, wherein the at least one first optical portion is a lens.

14. The lighting module according to claim 1, wherein a material of the at least one first optical portion is PVC, glass, polycarbonate, or PMMA.

15. The lighting module according to claim 1, wherein the at least one first beam forms part of a low-type beam and wherein the optical element comprises at least one second optical portion having an optical axis, a focus, and a third light source arranged in a vicinity of the focus of the at least one second optical portion to produce the second beam forming part of the low-type beam.

16. A lighting module for a motor vehicle, comprising:
an optical element to produce at least one first beam exhibiting an at least partly oblique cut-off, the optical element comprising at least one first optical portion having an optical axis and a focus,
at least one first light source, the at least one first light source being arranged at the focus for emitting first light rays toward the optical element to produce the at least one first beam, and
a second light source, the second light source being arranged at a distance from the focus, and not overlapping the focus, and offset relative to the at least one first light source on or near a vertical axis, the second light source emitting second light rays toward the optical element to produce a second beam at least partially lighting above the at least partly oblique cut-off, an optical beam formed by overlapping of the first beam with the second beam exhibiting no cut-off.

17. The lighting module according to claim 16, wherein the second light source is offset relative to the at least one first light source on a transverse axis.

18. The lighting module according to claim 16, wherein the at least one first light source exhibits a light emission zone comprising an edge, the edge being arranged at the focus of the at least one first optical portion of the optical element.

19. The lighting module according to claim 18, wherein the at least one first light source is oriented facing the optical element such that the edge is an oblique edge.

20. The lighting module according to claim 19, wherein the second light source is oriented facing the optical element identically to the orientation of the at least one first light source facing the optical element.

* * * * *